March 1, 1960  F. J. HAHN  2,926,874
FISH POLE HOLDER AND SUPPORT
Filed Sept. 12, 1955
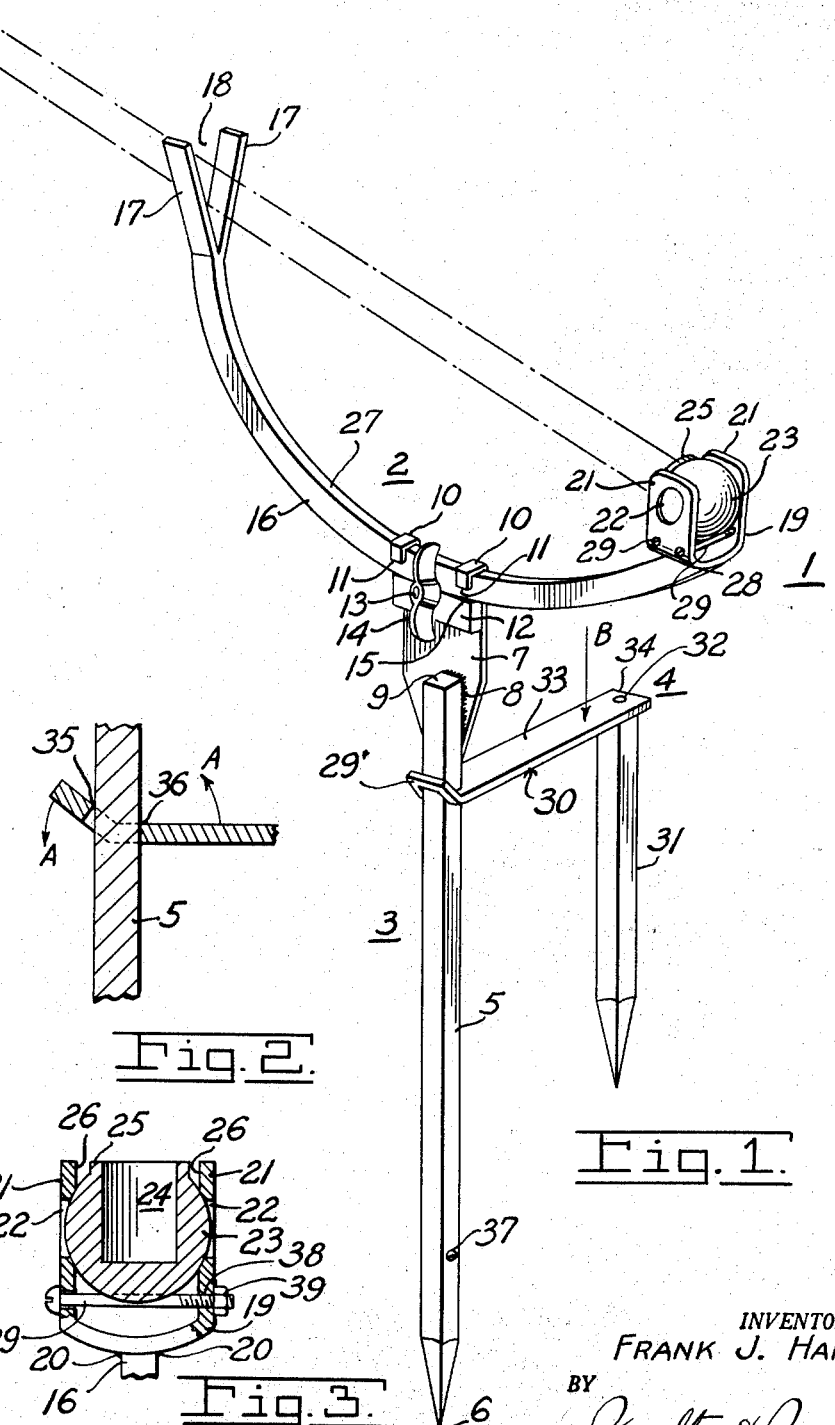
INVENTOR.
FRANK J. HAHN
BY
Zugelter & Zugelter
Attys.

United States Patent Office 2,926,874
Patented Mar. 1, 1960

2,926,874

FISH POLE HOLDER AND SUPPORT

Frank J. Hahn, Delhi Hills, Ohio

Application September 12, 1955, Serial No. 533,626

2 Claims. (Cl. 248—44)

This invention relates to fishing gear and more particularly to fish pole holders. This invention provides an improvement in fish pole holders of the type shown and claimed in my copending application Serial No. 456,956 filed September 20, 1954.

An object of this invention is to provide a strong fish pole holder of simple, durable construction adapted for manufacture at low cost.

A further object of this invention is to provide a fish pole holder of the above character which occupies a minimum amount of space when transported, as in a fishing tackle box.

A further object of this invention is to provide a fish pole holder of the above character having a stake portion adapted to be driven into a supporting body, such as the shore of the water body to be fished and having means for imbedding the stake portion by foot or hand applied force without the use of other tools or objects.

A further object of this invention is to provide a fish pole holder of the above character provided with a pole holding cradle having a ball-socket for receiving and holding the butt end portion of a fish pole.

Another object of this invention is to provide a fish pole holder comprising a downwardly arched cradle having a ball-socket swingably mounted adjacent one end thereof for receiving the butt end of a fish pole, said cradle being bifurcated to provide a V-rest adjacent its end spaced from said ball-socket and being adapted to co-operate with support means therefor.

A further object of this invention is to provide a fish pole holder of the above character having a cleat arm, an aperture adjacent one end of the cleat arm and in which a portion of the main support member is received, an auxiliary outrigger anchor stake secured to the cleat arm adjacent its other end, the cleat arm interlocking in fixed relation to the main support member when it extends substantially perpendicularly thereto with the auxiliary anchor stake in substantial parallelism to the main support member, the cleat arm being swingable into non-interlocking relation to the main support member to permit movement thereof into position as desired longitudinally of the main support member and stop means limiting the longitudinal advance of the cleat arm along the main support member.

The above and other objects and features of this invention will in part be obvious and will in part be apparent to those having ordinary skill in the art to which this invention pertains, from the following description and the drawing, in which:

Figure 1 is a view in perspective of a fish pole holder embodying the present invention, in co-operative relation to which a fragmentary portion of a fish pole is shown in dot-dash lines;

Fig. 2 is a fragmentary view in vertical section more clearly showing the cleat arm in interlocking relation with the post member; and Fig. 3 is a fragmentary view in vertical elevation, partly in section, of the cradle and ball-socket.

A fish pole holder 1 embodying my invention is shown in Fig. 1. Fish pole holder 1 comprises a fish pole cradle 2, a main support assembly 3, and cleat arm assembly 4. The main support assembly 3 comprises an elongate bar or post 5 which, adjacent its lower end, tapers to a point 6, and a plate member 7, secured by means such as weld 8 to bar 5 such that members 5 and 7 are joined in unitary relation. As shown in Fig. 1, plate 7 extends beyond the upper end 9 of post 5 and has integral finger portions 10 bent into the form of recurving hooks, the free end or tip portions 11 of which extend toward end 6 of member 5. A transverse rib member 12 is secured to plate 7 in any suitable fashion, such as by welding. As illustrated in Fig. 1, rib 12 is opposite fingers 10 and spaced from the free ends 11 thereof. Threaded stud 13 projects from rib 12 to which it is affixed. Stud 13 is positioned relative to edge 15 of rib 12 so that a portion of one face of nut 14 extends beyond edge 15 of rib 12.

The fish pole cradle 2, illustrated in Figs. 1 and 3, is preferably formed from a piece of elongate material of substantially rectangular cross section and bent into an arched or curved form to form cradle frame 16. Adjacent one end of cradle frame 16 a V-rest is provided. The V-rest may be fabricated by slitting a portion of frame 16 to form a pair of arms 17 which may be bent into the positions illustrated in Fig. 1 to define the V-notch 18. Alternatively, a V-shaped member may be formed and then joined in similar relation to cradle 16. The second end of cradle frame 16 is provided with a yoke portion 19 unitarily joined thereto by means such as welds 20 shown in Fig. 3. The U-shape yoke member 19 has a pair of substantially parallel upstanding arms 21 in which coaxial apertures 22 are provided. A ball-socket member 23 having a substantially cylindrical socket or cavity 24 extending diametrally therein is received and held in yoke 19 in mating relation with the conforming bearing surfaces, concave seats, disposed annularly about the apertures 22 as illustrated in Fig. 3. Member 23, when so mounted in yoke 19, is free to rotate about a plurality of axes. An annular lip 25 is disposed about the mouth of cavity 24 and projects outwardly from the spherical surface of ball member 23. Lip 25 is adapted to coact with faces 26 of arms 21 of yoke 19 to preclude rotation of ball member 23 into a position in which yoke arm 21 would constitute an interfering obstruction to insertion and/or withdrawal of the butt end portion of a fish pole into or from socket 24. The radial thickness of lip 25 and the distance which it projects from the spherical surface of ball member 23 are for this reason determined in view of the relative positions of yoke arms 21 and ball member 23. Further, socket 24 preferably extends beyond the center of member 23 but not through member 23. The static balance of ball 23 is thus such that ball 23 normally tends to seek a position in which the mouth of cavity 24 is uppermost, facilitating insertion of the butt end portion of the fish pole.

To assemble cradle 2 into co-operative relation with main support assembly 3, wing nut 14 is removed from stud 13 and cradle frame 16 is inserted through the space between the tip portions 11 of the fingers 10 and rib 12 with its edge face 27 leading. As the cradle frame 16 is advanced into the operative position, it is rotated approximately 90° in a counterclockwise direction, into the position shown in Fig. 1, with the edge 27 thereof opposite fingers 10 and edge 28 thereof in substantially face-to-face relation to the face of rib 12 opposite fingers 10. Thereafter, nut 14 is reengaged with stud 13 and advanced toward cradle frame 16. Replacement of nut 14 precludes removal of cradle 2 from operative relationship to main support assembly 3. Cradle frame 16 is preferably thicker than rib 12 and is engaged by nut 14 before rib 12 is. However, nut 14 need not be run down into tight abutting relation to cradle frame 16, unless secondary auxiliary locking of cradle 2 relative to main support assembly 3 is desired. In normal use forces tend to rock cradle 2 relative to main support assembly 3, effecting interlocking co-operation between faces 27 and 28 of cradle frame 16 respectively with fingers 10 and rib 12. The interlocking of these parts provides satisfactory fixation of their relative positions under most fishing conditions.

To facilitate insertion of post 5 into a co-operative supporting medium, I provide cleat arm assembly 4 which comprises arm 30, and auxiliary post 31. The arm 30 is an elongate member having a portion 29' adjacent one of its ends bent upward along a transverse line. An aperture is provided in arm 30 and positioned such that portions thereof lie on opposite sides of the fold line. As shown, the post 5 is square in cross section. The aperture is shaped such that its walls lie in abutting or close-spaced relation to the faces of post member 5 when major portion 33 of arm 30 extends substantially perpendicular to member 5 so that when post 5 and auxiliary post 31 are both imbedded in the ground, the post 5 can not turn. Auxiliary post 31 is fixedly secured to arm 30 adjacent end 34 thereof and extends perpendicular to portion 33. In the form illustrated in Fig. 3 auxiliary post 31 is secured to arm 30 by riveting or burring over a projecting stud portion 32 of post 31 which extends through an aperture provided in arm 30. Cleat arm assembly 4 may be re-positioned relative to post member 5 by swinging same in the direction of arrows A in Fig. 2. When the cleat arm has been slid along post 5 into the position desired, it may be swung in the direction opposite to that indicated by arrows A in Fig. 2, bringing the arm 30 and post 5 into frictional interlocking engagement at 35 and 36 (in Fig. 2). When the arm 30 is perpendicular to post 5 and the auxiliary post is parallel to post 5, force applied against arm 30 in the direction indicated by arrow B in Fig. 1 tends to advance post 5 and auxiliary post 31 in unison in that direction as for inserting same into a suitable supporting medium such as earth, sand or the like. I prefer to position cleat arm 4 longitudinally relative to post 5, such that auxiliary post 31 is substantially buried in the supporting medium when post 5 has been advanced to the desired depth. Auxiliary post 31 being spaced radially from post 5 and joined thereto by the connecting arm portion 30, substantially precludes rotation of post 5 and the remainder of the fish pole support associated therewith and also contributes to the stability of the post member 5.

Cleat arm assembly 4 may be retained in permanently assembled relation to post 5 by stop member 37 adjacent but spaced from end 6 of post 5. When stop 37 is provided, cleat arm assembly 4 may be moved longitudinally along post 5 to positions as desired between stop 37 and plate member 7 which serves as a stop at the opposite end of the path of travel of cleat arm assembly 4.

As shown in Figs. 1 and 3 the screws 29 extend through arms 21 near the bases thereof, and are adapted to draw arms 21 toward each other for precluding unintentional removal of ball member 23 from co-operative engagement with yoke 19 due to spreading of arms 21. Screw 29 may threadedly engage arm 21 at 38 and nut 39.

Having thus described the invention, it will be apparent to those having ordinary skill in the art to which this invention pertains, that various modifications and changes may be made in the illustrated embodiment, without departing from the spirit or the scope of the appended claims.

Therefore, what is claimed as new and desired to be secured by Letter Patent is:

1. A fish pole holder comprising an elongate support having a lower end adapted for advancement into a co-operating supporting medium and having at least one hook portion extending from the upper end thereof, the tip portion of said hook extending toward said first mentioned end, an abutment member adjacent and spaced from and opposite said hook, said hook and abutment defining a slideway extending substantially transversely of said support member, a downwardly arched cradle frame having maximum curvature adjacent its ends and minimum curvature in the mid-section thereof, said cradle frame being slidably received in said slideway and adapted for interlocking co-operation with said hook portion and abutment, said cradle frame adjacent one end thereof having a pair of diverging arms which form a V-rest for a portion of a fish pole, and having a U-shaped yoke adjacent the other end thereof, the arms of said yoke having coaxial apertures, opposed concave seat face respectively disposed annularly about said apertures, a hollow ball-socket co-operating with said seat faces for rotation about a plurality of axes, the socket in said ball extending diametrally to a point beyond the center of said ball for receiving the butt end portion of a fish pole, an annular upstanding lip encircling the mouth of said socket, said lip being of a thickness which precludes swinging of said ball-socket into a position in which said yoke arms might interfere with insertion and removal of the butt end portion of a fish pole from said socket, a cleat arm, a minor portion of said cleat arm adjacent one end thereof being disposed at an obtuse angle to the major portion thereof, said cleat arm having an aperture at least one portion of which extends through the minor portion of said cleat arm, said aperture being adapted to slidably receive said support member, said cleat arm being adapted to grip said support member at positions longitudinally thereof as desired when the major portion of said cleat arm extends substantially perpendicularly thereto with the minor portion extending away from the first mentioned end of said support member, and an auxiliary support member secured to said cleat arm adjacent the free end of the major portion thereof, the free end of said auxiliary support and the first mentioned end of said support member being disposed on the same side of the cleat arm, whereby said support member and said auxiliary support member may be advanced in unison into a supporting medium by application of driving forces to said cleat arm.

2. In a fish pole holder including a support member, a downwardly arched cradle frame supported by the support member and having a pair of arms extending from one end thereof forming a V-rest, adapted to engage and hold a fish pole against axial displacement, a U-shaped yoke adjacent the other end thereof, there being a pair of opposed concave seats provided in the arms of the U-shaped yoke, and a ball-socket member in co-operating relation to said seats for swinging about a plurality of intersecting axes, said ball-socket member being adapted to receive and hold the butt end portion of a fish pole in a socket cavity extending diametrally beyond the center thereof, an upstanding lip disposed annularly about the mouth of the socket cavity, said lip being adapted to co-operate with the arms of the U-shaped yoke to preclude rotation of the ball-socket member into positions in which the arm of the U-shaped yoke would interfere with the insertion or removal of the butt end portion of a fish pole from the socket cavity therein.

References Cited in the file of this patent

UNITED STATES PATENTS

| 245,659 | Benner | Aug. 16, 1881 |
| 704,991 | Warren | July 15, 1902 |
| 989,386 | Miller | Apr. 11, 1911 |
| 1,246,283 | Kramer | Nov. 13, 1917 |
| 1,666,293 | Lorton | Apr. 17, 1928 |
| 1,677,889 | Gairing | July 24, 1928 |
| 2,694,538 | Consolo et al. | Nov. 16, 1954 |

FOREIGN PATENTS

| 7,698 | Great Britain | Mar. 28, 1911 |
| 189,339 | Switzerland | May 1, 1937 |